F. STICKEL.
PUMP.
APPLICATION FILED MAR. 18, 1921.
1,425,614. Patented Aug. 15, 1922.
2 SHEETS—SHEET 2.
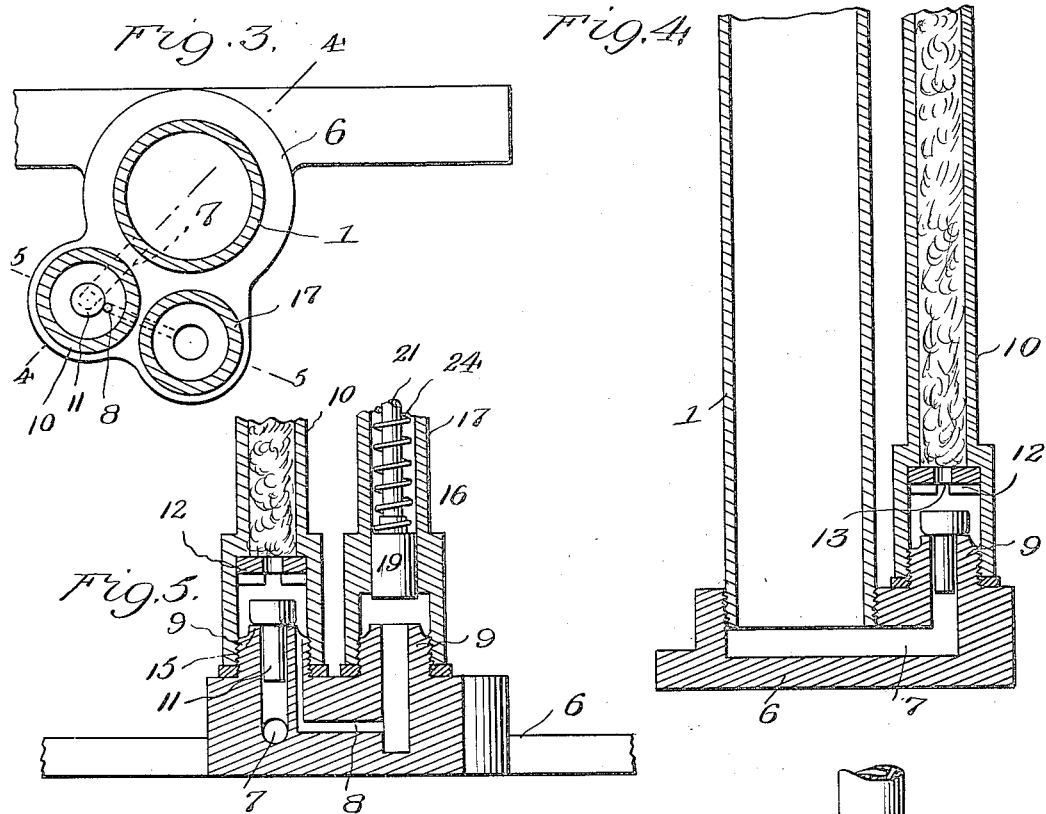
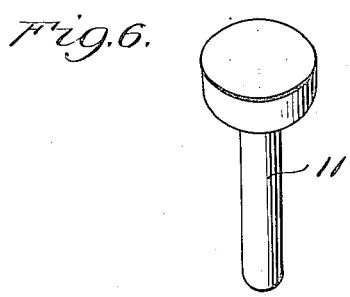
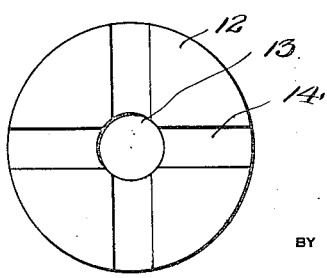
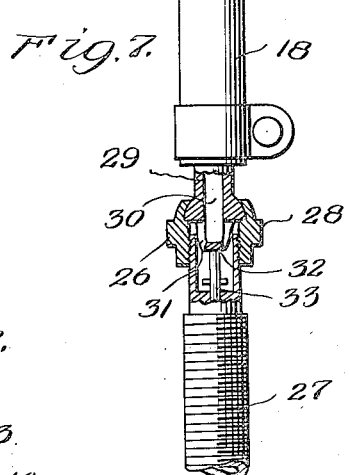
FREDERICK STICKEL
INVENTOR
BY Victor J. Evans
ATTORNEY
WITNESS:

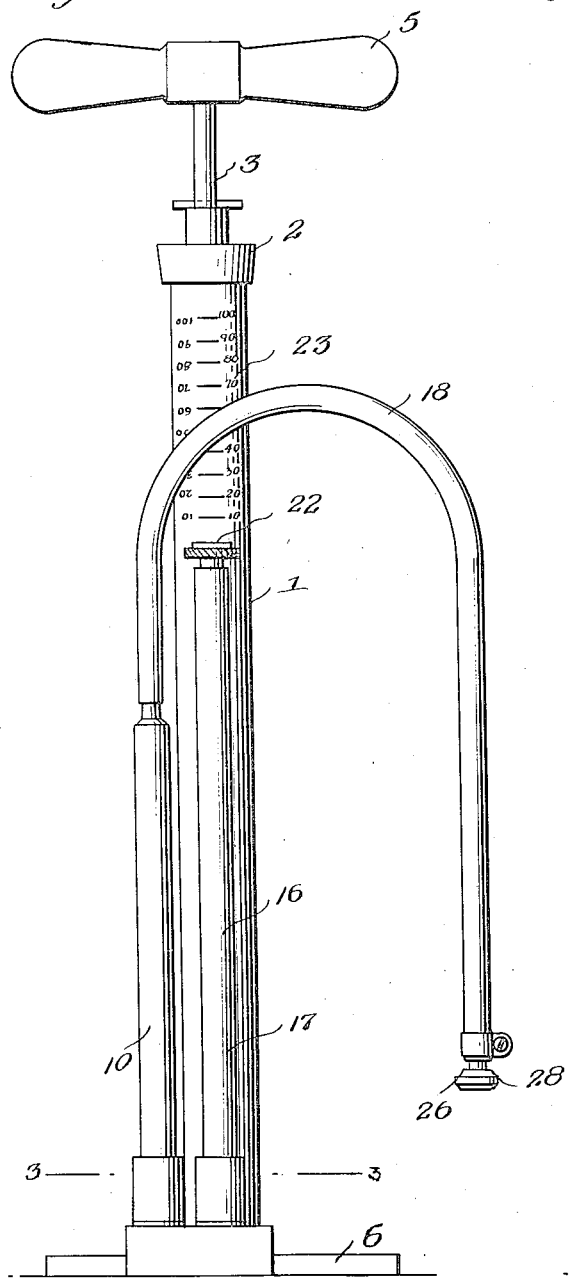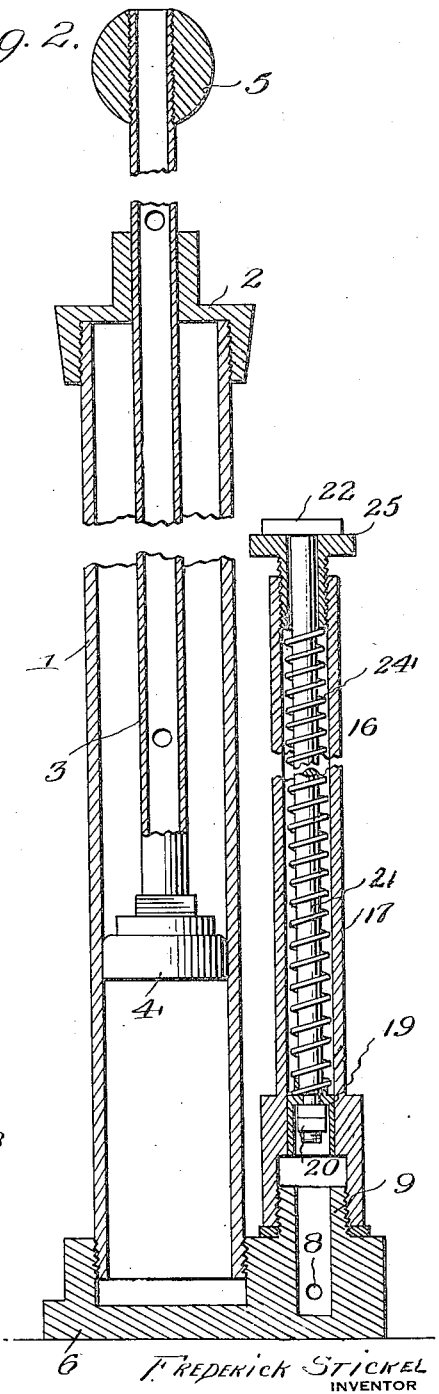

UNITED STATES PATENT OFFICE.

FREDERICK STICKEL, OF CHICAGO, ILLINOIS.

PUMP.

1,425,614.  Specification of Letters Patent.  Patented Aug. 15, 1922.

Application filed March 18, 1921. Serial No. 453,277.

*To all whom it may concern:*

Be it known that I, FREDERICK STICKEL, a citizen of the United States, residing at Chicago, in the county of Cook and State of Illinois, have invented new and useful Improvements in Pumps, of which the following is a specification.

This invention relates to a pump and more particularly to a pressure pump and has for its primary object the provision of construction whereby in the operation of an air pump, a visible indication will be given at all times of the amount of pressure within the tire.

An object of the invention is to construct and arrange the parts so that the indicator is permanently subject to the air pressure within the tire thereby preventing false indications.

Another object of the invention is the provision of an indicator that is continuous in communication with the interior of the tire independently of the operation of the pump.

A feature of my invention is the novel construction of coupling that continuously holds the tire valve open whereby the indicator will be continuously subject to air pressure, and arranging a valve in a position that the communication between the indicator and tire will not be interfered with, but properly allow the pressure of air to pass from the pump barrel to the tire.

The present invention embodies improvements over the structure shown in my co-pending application Serial No. 398,404, filed July 23, 1920.

With these and other objects in view the invention will be better understood from the following detailed description taken in connection with the accompanying drawing wherein:

Fig. 1 is a side elevation of a pump according to my invention.

Fig. 2 is a vertical sectional view on a line 2—2 of Fig. 1.

Fig. 3 is a horizontal sectional view on a line 3—3 of Fig. 1.

Fig. 4 is a sectional view on a line 4—4 of Fig. 3.

Fig. 5 is a sectional view on a line 5—5 of Fig. 3.

Fig. 6 is a perspective view of one of the valves.

Fig. 7 is a detailed sectional view showing co-action between the coupling and the tire valve.

Fig. 8 is a plan view of the valve seat.

Again referring to the drawings illustrating one of the many constructions of my invention numeral 1 designates a pump barrel provided with the usual cap 2 that slidably receives the rod 3 at the lower end of which is connected a piston 4, at the upper end a handle 5. The construction and advantages of the rod 3 and piston 4 are clearly set forth in my co-pending application filed July 23, 1920, Serial No. 398,404, and, therefore, a detailed description thereof will be eliminated for the sake of clearness. The numeral 6 designates a base for the barrel. This base 6 is formed to provide an air passage 7 and a by pass 8 each of which is surrounded by a threaded nipple 9. Engaging one of the nipples 9 is a cylinder 10 in which is arranged an oil absorbing material such as cotton gauze. The interior of the cylinder communicates with passage 7 and this communication is controlled by a check valve 11. The valve seat 12 for the check valve is in the form of a disc pressed into the interior of the cylinder, and provided with a vertical air passage 13 and laterally extending grooves 14 in communication with the passage. This assures proper circulation of the air when the valve leaves its seat 15 and engages the seat 12.

Engaging the other nipple 9 is my specially constructed indicator 16. This indicator consists of a tube 17 threaded to the nipple 9 and extending parallel to the barrel 1. This tube is in communication with one end of the by pass 8, the other end of which is continuously in communication with the cylinder 10 at one side of the valve 11, and as the cylinder 10 is continuously in communication with the usual flexible tubing 18 of the pump, it will be seen that the interior of the tube 17 is continuously subject to the air pressure within the tire. Slidably supported in the tube is a plunger 19 clamped by the nuts 20 to the lower end of the stem 21. This stem 21 projects above the tube and forms into a head 22 that co-acts with the scale marks 23 on the pump barrel. A spring 24 regulates the movement of the stem in accordance with the pressure within the tube, and the tension of the spring can be accurately regulated by the nut 25, and thus it will be seen that an accurate reading is assured.

To assure the tube being in constant communication with the interior of the tire I provide a specially designed coupling 26 for connecting the flexible tubing to the tire valve 27. This coupling consists of a nut 28 for screw threaded engagement with the valve, that has a swivel connection with the nipple 29. This nipple 29 is provided with a centrally arranged air passage 30 and slots 31. In connection with the passage a cross piece 32 is arranged to engage the valve stem 33 and unseat the same so that air may readily pass through the passage 30 and slots 31 into the tire during downward movement of plunger 4 and in the return movement of the plunger air pressure will pass through the slots and passage 30 into tube 17 for equalizing the pressure. This equalizing pressure co-action the stem 21 ascends thereby moving the head 22 over the scale mark. As soon as the pressure is equalized further movement of the head stops, and an instant reading may be taken of the pressure within the tire.

An important feature is the arrangement of the valve 11 which enables the pump to operate in its usual manner without interfering with the direct communication of the indicator with the interior of the tire. It will also be noted that in making an indication it is not necessary for any parts to move thereby assuring accurate reading.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A combined pump and pressure indicator comprising a pump barrel, a cylinder extending parallel with said barrel, a supporting base for said cylinder and barrel provided with a passage establishing communication between the barrel and cylinder, said barrel provided with an air chamber in its lower end, a check valve for controlling passage of air into said chamber, an indicator carried by said base and comprising a tube having an air chamber in its lower end, said base provided with a by pass establishing communication between the chambers in said cylinder and tube, and means within said tube adapted to be acted upon by air entering the chamber in the tube for indicating the pressure of the air.

2. A combined pump and pressure indicator comprising a pump barrel, a cylinder extending parallel with said barrel, a supporting base for said cylinder and barrel provided with a passage establishing communication between the barrel and cylinder, said barrel provided with an air chamber in its lower end, a check valve for controlling passage of air into said chamber, an indicator carried by said base and comprising a tube having an air chamber in its lower end, said base provided with a by pass establishing communication between the chambers in said cylinder and tube, means within said tube adapted to be acted upon by air entering the chamber in the tube for indicating the pressure of the air, a flexible tube having one end in communication with said cylinder, and a coupling attached to the other end of said flexible tube and constructed to hold a tire valve open continuously.

3. A combined pump and pressure indicator comprising a pump barrel, a base for the pump barrel, a cylinder carried by the base, said base provided with a passage establishing communication between the barrel and cylinder, a check valve controlling communication of said passage and cylinder, a flexible tubing having one end in communication with the cylinder, a coupling on the other end of said tubing for communication with a tire valve, a rigid tube connected to said base, a by pass in said base establishing communication between said cylinder and tube, a piston movable in said tube, a stem carried by said piston, a head upon said stem and position exteriorly of the tube and co-acting with the scale marks on the pump barrel, a spring for controlling movement of said piston and stem, and means for adjusting the tension of said spring.

4. A combined pump and pressure indicator comprising a barrel, a base for the barrel having an air passage, and a by pass, a piston for operation within the barrel, a handle connected thereto, a cylinder having a detachable connection with the base, and communicating with said air passage, a check valve controlling the communication of said passage with the cylinder, grease absorbing material within the cylinder, a flexible tubing having one end in communication with the cylinder, a coupling on the other end of the tubing for connection with a tire valve and holding the same continuously open, a tube having detachable connection with the base and continuously communicating with said by pass, said by pass also communicating with the interior of said cylinder, a piston working in said tube, a stem projecting therefrom and having a head projected exteriorly of the tube, and co-acting with scale marks on the pump barrel, a spring controlling the movement of the stem, and a nut controlling the tension of said spring.

5. A combined pump and pressure indicator comprising a pump barrel, a base for the pump barrel, a cylinder carried by the base, said base provided with an air passage establishing communication between the barrel and cylinder, a check valve controlling communication of said passage and cylinder, a flexible tubing having one end in communication with the cylinder, a coupling on the other end of said tubing for communication with a tire valve, a rigid tube connected to said base, a by pass in said base establishing communication between said cylinder and tube, a piston movable in said tube, a stem carried by said piston, a head upon said stem and positioned exteriorly of the tube and co-acting with the scale marks on the pump barrel, a spring for controlling movement of said piston and stem, and means for adjusting the tension of said spring, oil absorbing material within said cylinder, and a valve seat for preventing passage of the oil absorbing material into the chamber in said cylinder.

In testimony whereof I affix my signature.

FREDERICK STICKEL.